(12) United States Patent
Hacikyan (10) Patent No.: US 9,296,060 B2
(45) Date of Patent: Mar. 29, 2016

(54) FIELD-CUSTOMIZABLE INFLATABLE PURGE DAM APPARATUS

(71) Applicant: Michael Hacikyan, Amherst, NY (US)

(72) Inventor: Michael Hacikyan, Amherst, NY (US)

(*) Notice: Subject to any disclaimer, the term of this patent is extended or adjusted under 35 U.S.C. 154(b) by 0 days.

(21) Appl. No.: 13/666,060

(22) Filed: Nov. 1, 2012

(65) Prior Publication Data

US 2014/0117068 A1 May 1, 2014

(51) Int. Cl.
*B23K 37/00* (2006.01)
*B23K 9/32* (2006.01)

(52) U.S. Cl.
CPC ............... *B23K 9/326* (2013.01); *B23K 9/325* (2013.01)

(58) Field of Classification Search
None
See application file for complete search history.

(56) References Cited

U.S. PATENT DOCUMENTS

| | | | | |
|---|---|---|---|---|
| 2,202,577 A | * | 5/1940 | Evans | A61C 9/0013 433/35 |
| 3,292,254 A | * | 12/1966 | Sloan | 228/219 |
| 3,633,813 A | * | 1/1972 | Looney et al. | 228/41 |
| 3,724,273 A | * | 4/1973 | Awrey | 73/714 |
| 3,765,665 A | * | 10/1973 | Work | 269/27 |
| 3,789,490 A | * | 2/1974 | Kohart | 219/98 |
| 3,937,382 A | * | 2/1976 | Cunningham et al. | 228/49.3 |
| 3,994,429 A | * | 11/1976 | Hallenbeck et al. | 228/57 |
| 4,096,372 A | * | 6/1978 | Hallenbeck | 219/72 |
| 4,101,067 A | * | 7/1978 | Sloan et al. | 228/222 |
| 4,756,656 A | * | 7/1988 | Candee | G21C 19/26 285/26 |
| 4,815,650 A | * | 3/1989 | Reaux | 228/119 |
| 4,864,845 A | * | 9/1989 | Chandler | G01N 15/0826 702/12 |
| 4,875,615 A | * | 10/1989 | Savard | 228/119 |
| 5,100,043 A | * | 3/1992 | Hallenbeck | 228/42 |
| 5,187,343 A | * | 2/1993 | Edwards | 219/74 |
| 5,389,314 A | * | 2/1995 | Wang | 264/454 |
| 5,390,846 A | * | 2/1995 | Thode | 228/219 |
| 5,471,030 A | * | 11/1995 | Boula | 219/121.13 |
| 5,601,225 A | * | 2/1997 | Wood et al. | 228/9 |

(Continued)

FOREIGN PATENT DOCUMENTS

| | | | |
|---|---|---|---|
| CN | 201862908 U | * | 6/2011 |
| DE | 3008153 A | * | 9/1981 |

(Continued)

OTHER PUBLICATIONS

Machine translation of CN-201862908U (no date available).*

(Continued)

*Primary Examiner* — Kiley Stoner
(74) *Attorney, Agent, or Firm* — Walter W. Duft (57) ABSTRACT

A field-customizable inflatable purge dam apparatus for welding includes first and/or second inflatable purge bladders. A bridge conduit extends between the purge bladders. First and second quick-disconnect couplers are provided for detachably connecting the bridge conduit to the first and second purge bladders, respectively. The quick-disconnect couplers allow the bridge conduit to be selectively attached to, and detached from, one or both of the first and second purge bladders. The purge dam apparatus can be field-customized by combining the bridge conduit with one or more different purge bladders. Alternatively, the purge bladders may be selectively combined with one or more different bridge conduits. In another aspect, one end of the bridge conduit may be detachably connected to a single inflatable purge bladder, and the other end of the bridge conduit may be adapted to connect to a purge gas source. Various purge dam apparatus sub-assemblies may also be provided.

17 Claims, 5 Drawing Sheets

(56) References Cited

U.S. PATENT DOCUMENTS

| | | | | |
|---|---|---|---|---|
| 5,669,547 | A * | 9/1997 | Spring | 228/219 |
| 5,827,265 | A * | 10/1998 | Glinsky et al. | 606/8 |
| 6,079,750 | A * | 6/2000 | Kacines | F16L 37/0987 285/192 |
| 6,082,359 | A * | 7/2000 | Preston | A62B 9/02 128/202.27 |
| 6,595,968 | B1 * | 7/2003 | Perrino | A61M 3/025 604/279 |
| 6,637,640 | B1 * | 10/2003 | Sennett | 228/44.3 |
| 7,112,358 | B1 | 9/2006 | Hacikyan | |
| 2003/0070743 | A1 * | 4/2003 | Kesapradist et al. | 156/158 |
| 2005/0046185 | A1 * | 3/2005 | Olson | F16L 37/088 285/321 |
| 2008/0029578 | A1 * | 2/2008 | Steel et al. | 228/2.1 |
| 2009/0018486 | A1 * | 1/2009 | Goren et al. | 604/21 |
| 2009/0127320 | A1 * | 5/2009 | McKee, Jr. | 228/219 |
| 2009/0208367 | A1 * | 8/2009 | Calio | B08B 3/00 422/26 |
| 2009/0230104 | A1 * | 9/2009 | Domec et al. | 219/121.78 |
| 2010/0051672 | A1 * | 3/2010 | Nunnery | 228/212 |
| 2011/0210112 | A1 * | 9/2011 | Boatner, Jr. | 219/158 |
| 2012/0125600 | A1 * | 5/2012 | Smith | 166/127 |
| 2012/0328371 | A1 * | 12/2012 | Munstereifel | F16L 1/26 405/169 |

FOREIGN PATENT DOCUMENTS

| | | | |
|---|---|---|---|
| EP | 0486420 | | 5/1992 |
| GB | 2327480 | A * | 1/1999 |
| GB | 2383108 | A * | 6/2003 |
| JP | 60-227975 | A * | 11/1985 |
| JP | 03-027877 | A * | 2/1991 |
| JP | 2005205460 | | 8/2005 |

OTHER PUBLICATIONS

Sumner Purge Dams Video https://www.youtube.com/watch?v=_2F488Ljrhk published Apr. 20, 2012.*

PCT ISA, International Search Report and Written Opinion of the International Searching Authority, counterpart PCT application No. PCT/US/2013/068084, Mar. 25, 2014, 13 pages.

* cited by examiner

FIELD-CUSTOMIZABLE INFLATABLE PURGE DAM APPARATUS

BACKGROUND

1. Field

The present disclosure relates generally to inert gas welding. More particularly, the invention is directed to inflatable purge dams for retaining purge gas around a weld zone.

2. Description of the Prior Art

By way of background, inert gas welding is a species of arc welding in which the molten weld pool is shielded from atmospheric contamination and oxidation by bathing it with an inert gas, such as Argon, or a mixture of Helium and Argon. Popular examples of inert gas welding include TIG (Tungsten Inert Gas) welding and MIG (Metal Inert Gas) welding.

When welding together pipes and other enclosed structures using inert gas welding, it is important to purge the interior of the pipe or structure in the vicinity of the weld zone to prevent corrosion and the formation of oxides on the interior side of the weld pool. Purge dams are conventionally used for this purpose. For example, when butt-welding the ends of two pipe sections to form a consolidated pipe run, two purge dam structures are placed in the pipes, one in each pipe on either side of the weld zone. A purge gas can then be introduced into the area between the dams.

Figure 1:
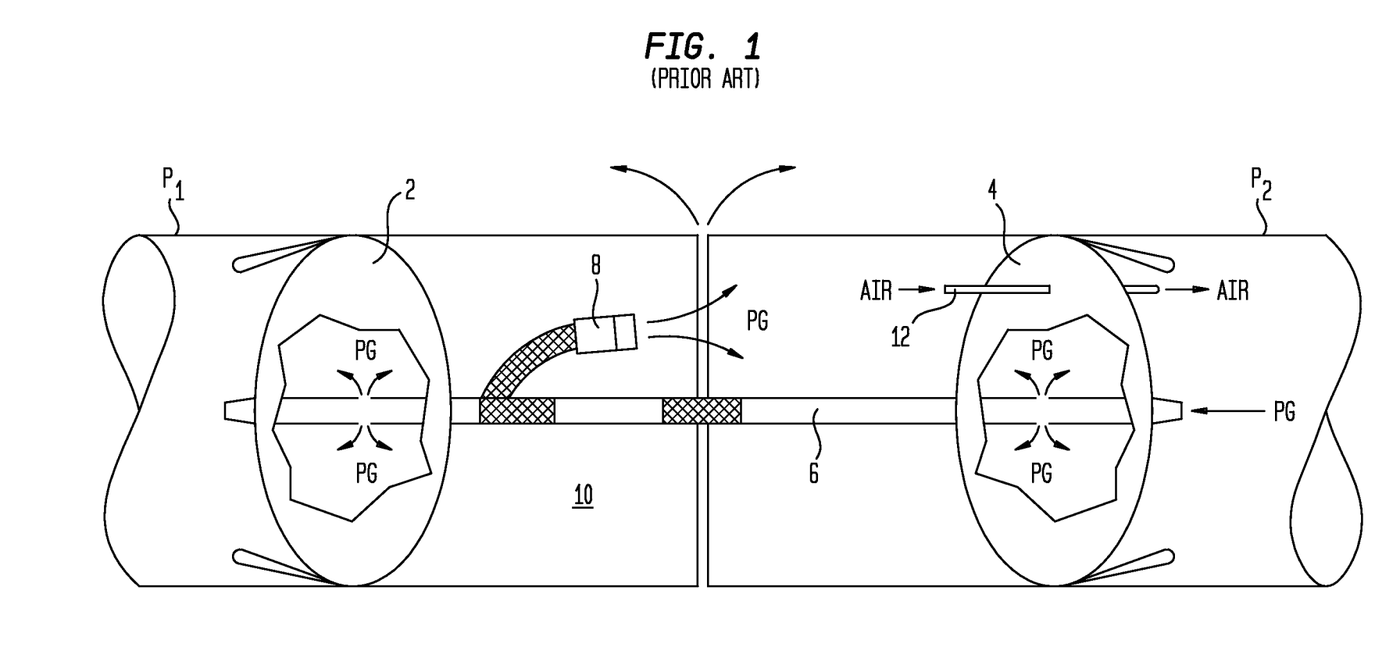
FIG. 1 is a side elevation view showing a prior art inflatable purge dam apparatus.

One well-known purging device used for pipe welding applications is the inflatable purge dam. As shown in FIG. 1, an inflatable purge dam typically include a pair of inflatable purge dam bladders 2 and 4 mounted on a purge gas delivery tube 6. The inflatable bladders usually comprise an inner bladder made from a resilient gas-impermeable material (such as latex rubber), and an outer protective cover made from fabric or other material (such as nylon) to protect the inner bladder from welding heat and caustic chemicals. The purge gas delivery tube is apertured inside the inflatable bladders so that the bladders will inflate when a purge gas "PG" is introduced. The purge gas delivery tube includes a pressure-sensitive gas discharge valve 8 located in the weld zone 10 that exists between the bladders. The discharge valve is designed to open when the purge gas reaches a predetermined pressure that is sufficient to inflate the bladders and ensure that the bladders form effective weld zone seals with the inside walls of the pipes P1 and P2 to be welded. Once the weld zone seals have been formed, the discharge valve will open, thereby releasing purge gas into the weld zone. An air vent tube 12 typically extends through one of the bladders. The vent tube vents air from the weld zone as it is displaced by the purge gas, and may be connected to oxygen monitoring equipment for monitoring the oxygen content within the weld zone.

Conventional inflatable purge dam devices as described above are sold in a fully assembled state. They come in different sizes for use in pipe installations of different nominal pipe size (NPS). Applicants have observed that if one of the purge bladders ruptures, it must either be repaired or an entire new assembly must be purchased. Applicants have further observed that there are certain welding applications wherein existing inflatable existing purge dam apparatus are not satisfactory, either because the pipe installation requires that the two purge bladders be of different size, or because the separation distance between the purge bladders is not optimal. In such cases, there is nothing the welder can do other than to use what is at hand. Applicants have additionally observed that there are occasions wherein only one purge bladder is needed rather than two, such as when only one of the pipes needs to be blocked. Accordingly, applicants submit that there is presently a need for improvement in the construction of inflatable purge dams. What is required in particular is an inflatable purge dam apparatus that can be easily repaired if one of the purge bladders ruptures, or which can be used in non-standard pipe installations where existing apparatus are not optimal, or which can be used for applications where only one purge bladder is required.

SUMMARY

Embodiments of a field-customizable inflatable purge dam apparatus for welding are disclosed. In one aspect, the purge dam apparatus includes first and second inflatable purge bladders. The first purge bladder has a first interior gas-receiving chamber, and defines a first port on one side thereof and a second port on another side thereof. The second purge bladder has a second interior gas-receiving chamber, and defines a first port on one side thereof. A bridge conduit extends between the second port of the first purge bladder and the first port of the second purge bladder. The bridge conduit comprises a gas flow passage therein, and may provide fluid communication between the first gas-receiving chamber and the second gas-receiving chamber. First and second quick-disconnect couplers are provided for detachably connecting the bridge conduit to the first and second purge bladders, respectively. The quick-disconnect couplers allow the bridge conduit to be selectively attached to, and detached from, one or both of the first and second purge bladders. The purge dam apparatus can thus be field-customized by combining the bridge conduit with one or more different purge bladders. Alternatively, the purge bladders may be selectively combined with one or more different bridge conduits.

According example embodiments disclosed herein, the first and second quick-disconnect couplers may each comprise a male coupler member and a female coupler member. The male coupler members can be respectively mounted at first and second ends of the bridge conduit. One of the female coupler members can be mounted to the second port of the first purge bladder so that it engages one of the male coupler members on the first end of the bridge conduit. The other female coupler member can be mounted to the first port of the second purge bladder so that it engages the other male coupler member on the second end of the bridge conduit. Alternatively, the other female coupler member can be mounted to a pressure-sensitive gas discharge valve that is mounted on the first port of the second purge bladder. The quick-disconnect couplers may be operable using a tool, such as a wrench, or they may be hand-operable, such as by way of a spring-loaded disconnect push button. The first and second purge bladders may be of the same size for use in pipe installations where the purge bladders engage pipe sections having the same diameter. Alternatively, the first and second purge bladders may be of different size for use in pipe installations where the purge bladders engage pipe sections having different diameters. The bridge conduit may be of a first length, and one or more additional bridge conduits of different length may be provided for connection between the first and second purge bladders, such that the distance between the purge bladders may be changed for use in different pipe installations.

In another aspect, the purge dam apparatus includes an inflatable purge bladder having a first interior gas-receiving chamber and defining a first port on one side thereof and a second port on another side thereof. A bridge conduit comprises a first end, a second end, and a gas flow passage therein. A quick-disconnect coupler is provided for detachably connecting the first end of the bridge conduit to the second port of the purge bladder. The second end of the bridge conduit is adapted for connection to a purge gas supply source. The quick-disconnect coupler allows the bridge conduit to be selectively attached to, and detached from, the purge bladder. The purge dam apparatus can thus be field-customized by combining the bridge conduit with one or more different purge bladders. Alternatively, the purge bladder may be selectively combined with one or more different bridge conduits.

In another aspect, various purge dam sub-assembly apparatus may be provided. One purge dam sub-assembly apparatus may include an inflatable purge bladder having a first interior gas-receiving chamber and defining a first port on one side thereof and a second port on another side thereof. A quick-disconnect coupler member may be attached to the inflatable purge bladder at the first port or the second port. The quick-disconnect coupler member is adapted to connect to a counterpart quick-disconnect coupler member on a bridge conduit that allows the inflatable purge bladder to be connected to a second inflatable purge bladder. In one variation, the quick-disconnect coupler member may be attached at the second port and the first port may be an open port in fluid communication with at least one purge gas delivery port. In another variation, the quick-disconnect coupler may be attached directly at the first port, or indirectly by way of a gas discharge valve assembly that is connected at the first port, and the second port may be a closed port. Another purge dam sub-assembly apparatus may include a bridge conduit having a first end and a second end. A quick-disconnect coupler member is attached to each of the first end and the second end. The quick-disconnect coupler members are adapted to connect to a counterpart quick-disconnect coupler member on an inflatable purge bladder.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 2:
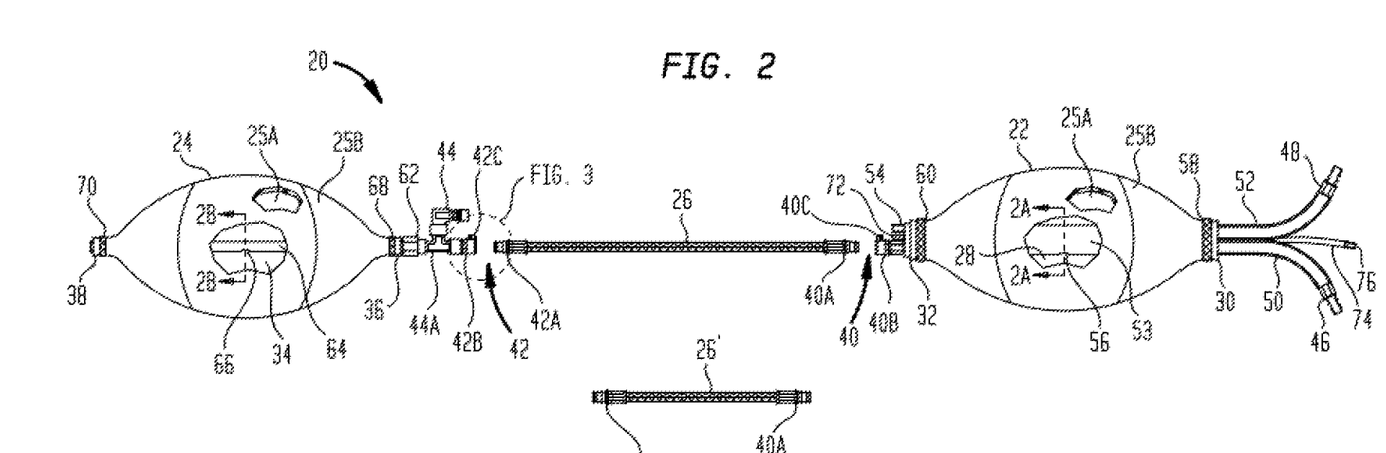
FIG. 2 is a side elevation view showing an example embodiment of an inflatable purge dam apparatus according to the present disclosure.

Turning now to the drawing figures, which are not necessarily to scale, like reference numbers are used to represent like elements in all of the several views. FIG. 2 illustrates a field-customizable inflatable purge dam apparatus 20 that may be used for pipe welding. During typical operation, the purge dam apparatus 20 may be disposed inside the ends of a pair of pipes (not shown) that are to be butt-welded together at a welding root gap. The purge dam apparatus 20 includes first and second inflatable purge bladders 22 and 24 that are detachably connected together by an intermediate bridge conduit 26. FIG. 2 shows the purge dam apparatus 20 in a deflated condition. During pipe welding, the purge bladders 22 and 24 may be inflated using a suitable purge gas, as described in more detail below.

The first purge bladder 22 has a first interior gas-receiving chamber 28, and defines a first open port 30 on one side thereof and a second open port 32 on another side thereof. The second purge bladder 24 has a second interior gas-receiving chamber 34, and defines an open first port 36 on one side thereof. The other side of the second purge bladder defines a closed second port 38. The first port 30 and the second port 32 of the first purge bladder 22 may be aligned proximate to a central longitudinal axis of the first purge bladder. The first port 36 and the second port 38 of the second purge bladder 24 may be aligned proximate to a central longitudinal axis of the second purge bladder. Various materials that may be used to construct the first and second purge bladders 22/24. For example, each purge bladder 22 and 24 may be formed with an expandable inner purge gas retaining liner 25A and an outer protective cover 25B, both of which are preferably heat resistant. The inner gas retaining liners 25A can be made from a resilient, substantially gas impermeable material, such as silicone rubber or other heat-resistant composition. The outer protective covers 25B can be made from a material that is more heat-resistant than the material used for the gas retaining liners, such as a heat-resistant fabric. If desired, the outer protective covers 25B can be made from a non-stretchable material, such as nylon. Alternatively, the outer protective covers 25B could be made from a stretchable material, such as a stretch fabric as disclosed in commonly-owned U.S. application Ser. No. 13/457,761, the contents of which are hereby fully incorporated herein by this reference.

The bridge conduit 26 extends between the second port 32 of the first purge bladder 22 and the first port 36 of the second purge bladder 24. The bridge conduit 26 may be constructed from any suitable conduit material, such as a braided or non-braided hose comprising heat-resistant material(s). It comprises an interior gas flow passage that supplies purge gas to the second purge bladder 24. First and second quick-disconnect couplers 40 and 42 are provided for detachably connecting the bridge conduit 26 to the first and second purge bladders 22 and 24, respectively. In the disclosed embodiment, the first and second quick-disconnect couplers 40 and 42 each comprise a male coupler member and a female coupler member. The male and female couplers of the first quick-disconnect coupler 40 are designated by reference numbers 40A and 40B, respectively. Likewise, the male and female couplers of the second quick-disconnect coupler 42 are respectively designated by reference numbers 42A and 42B. The male coupler members 40A and 42A are respectively mounted at first and second ends of the bridge conduit 26. The female coupler member 40B of the first quick-disconnect coupler 40 is mounted at the second port 32 of the first purge bladder 22, and engages its counterpart male coupler member 40A on the first end of the bridge conduit 26. The female coupler member 42B of the second quick-disconnect coupler 42 is arranged to engage its counterpart male coupler member 42A on the second end of the bridge conduit 42. The female coupler member 42B is mounted to a gas discharge valve assembly 44 that is, in turn, mounted at the first port 36 of the second purge bladder. Alternatively, if the gas discharge valve assembly 44 is not used, the female coupler member 42B could be mounted directly at the first port 36 of the second purge bladder 24.

Figure 3:
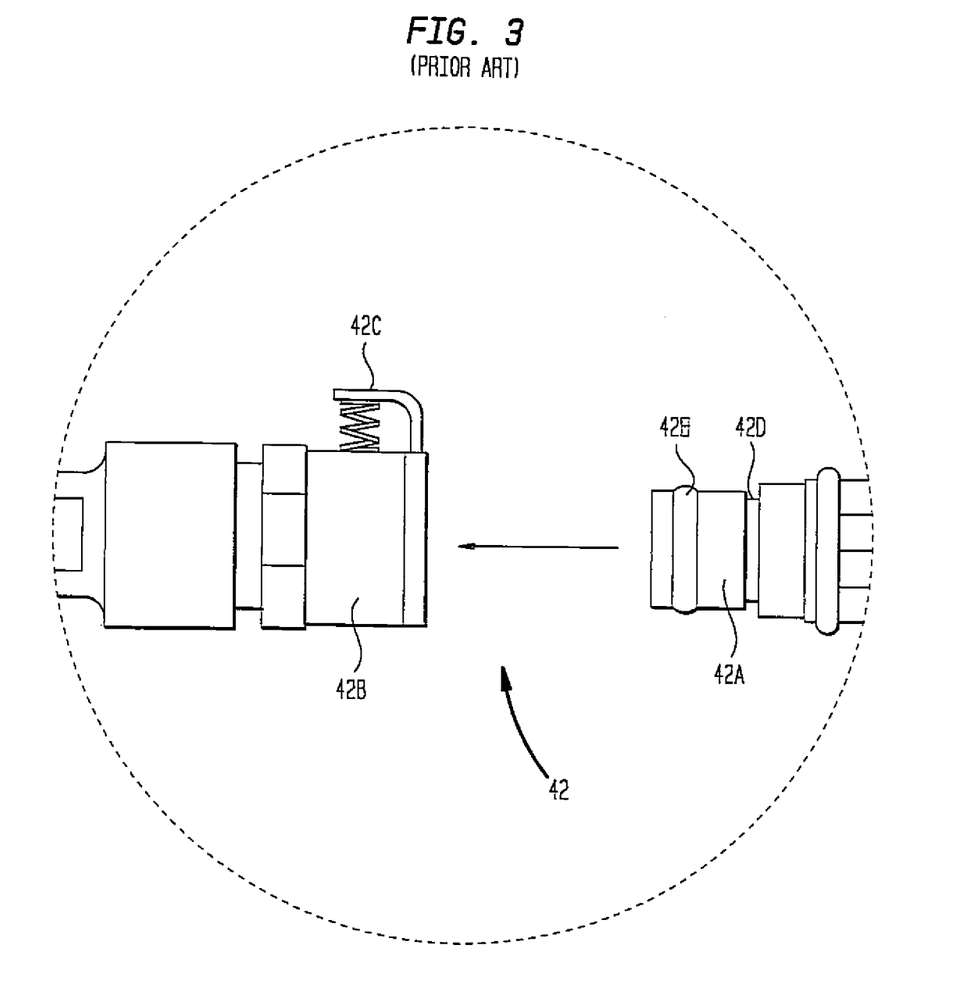
FIG. 3 is an enlarged detail view showing an example quick-disconnect coupler in the inflatable purge dam apparatus of FIG. 2.

As shown in FIG. 3, the female coupler members 40B and 42B may be respectively provided with spring-loaded disconnect push button clasps 40C and 42C that lockingly engage a channel 40D and 42D on the male coupler members 40A and 42A, such that the quick-disconnect couplers 40 and 42 are hand-operable. A resilient O-ring 40E and 42E is respectively provided on each of the male coupler members 40A and 42A to ensure a high-quality pressure seal. The above-described style of hand-operable quick-disconnect coupler is conventionally used with low pressure tubing. As such, FIG. 3, which illustrates only the quick-disconnect coupler 42 and not any portion of a purge dam apparatus, is indicated as representing prior art. Many other types of hand-operable quick-disconnect couplers may also be used in lieu of the illustrated couplers 40 and 42, including but not limited to other spring-assisted pneumatic air hose connectors, as well as various types of screw-connectors wherein the male and female portions simply screw together, etc. Alternatively, the illustrated quick-disconnect couplers 40 and 42 could be replaced with quick-disconnect couplers that are operable using a tool, such as connectors that include a wrench-engaging flange, a set screw, or other tool-engaging means. In general, the term "quick-disconnect coupler" as used herein refers to any type of component connecting arrangement providing a connection that is not intended to be permanent, and which allows components to be repeatedly attached to, and detached from, each other.

The quick-disconnect couplers 40 and 42 allow the bridge conduit 26 to be selectively attached to, and detached from, one or both of the first and second purge bladders 22 and 24. The purge dam apparatus 20 can thus be field-customized by combining the bridge conduit 26 with one or more different purge bladders. For example, if one or both of the purge bladders 22 or 24 ruptures, they can be disconnected from the bridge conduit 26 and replaced. Alternatively, the purge bladders 22 and 24 may be selectively combined with one or more different bridge conduits that may each be of different length. FIG. 2 shows one such additional bridge conduit 26'.

To use the purge dam apparatus 20 in a pipe welding operation, the first purge bladder 22 is placed in a first pipe end and the second purge bladder 24 is placed in a second pipe end. The purge bladders 22 and 24 are then inflated with a purge gas to block the pipe ends and establish a weld zone in the enclosed space between the purge bladders. This weld zone is purged of air by the purge gas. The purge gas may be introduced into the gas-receiving interiors 28 and 34 of the purge bladders 22 and 24, and into the weld zone, by any suitable means.

Figure 2A:
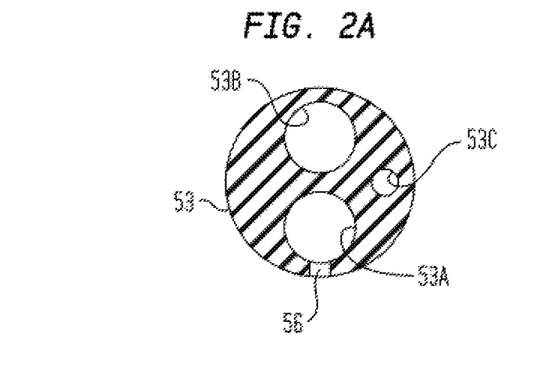
FIG. 2A is a cross-sectional view taken along line 2A-2A of FIG. 2.

In the illustrated embodiment, the purge dam apparatus 20 includes first and second purge gas entry ports 46 and 48, which may be implemented as connector couplers having a barbed tip on each end. The first purge gas entry port 46 inserts into the free end of a first inflation purge gas delivery tube 50, and the second purge gas entry port 48 inserts into the free end of a second inflation purge gas delivery tube 52. The free ends of the first and second purge gas entry ports 46 and 48 are adapted to receive purge gas from a purge gas supply, such as hose connected to a purge gas supply tank or from the tank itself. The first and second purge gas delivery tubes 50 and 52 extend to the first port 30 of the first purge bladder 22. There, they are connected to respective first and second gas-carrying pathways 53A and 53B of a multi-path conduit 53 (see FIGS. 2 and 2A). Although not shown, barbed-tip connector couplers similar to those used for the first and second purge gas entry ports 46 and 48 may be provided for this purpose. The multi-path conduit 53 extends from the first port 30 of the first purge bladder 22 to the second port 32 thereof.

The first gas-carrying pathway 53A of the conduit 53, which connects at a first end thereof to the first purge gas delivery tube 50 at the first port 30, is connected at a second end thereof to the female coupler member 40B at the second port 32. Although not shown, the female coupler member 40B may be configured with a barbed tip that inserts into the first gas-carrying pathway's second end to provide the desired connection. In combination with the first purge gas delivery tube 50, the first gas-carrying pathway 53A of the conduit 53 is used to supply purge gas from the first purge gas entry port 46 to the bridge conduit 26. The first gas-carrying pathway 53A may also be used to inflate the first purge bladder 22. This can be accomplished by forming one or more vent apertures 56 in the conduit 53 that vent pass purge gas from the first gas-carrying pathway 53A to the first gas-receiving chamber 28.

The second gas-carrying pathway 53B of the conduit 53, which connects to the second purge gas delivery tube 52 at the first port 30 of the first purge bladder 22, is connected to a purge gas discharge vent 54 at the second port 32 of the first purge bladder 22. Although not shown, the purge gas discharge vent 54 may be implemented as a coupler having a barbed tip on one end that inserts into the second gas-carrying pathway's second end to provide the desired connection. In combination with the second purge gas delivery tube 52, the second gas-carrying pathway 53B of the conduit 53 is used to supply purge gas from the second purge gas entry port 48 to the enclosed space between the purge bladders 22 and 24 that defines the weld zone.

Each end of the conduit 53 may be respectively secured to the first and second ports 30 and 32 in any suitable manner. In the illustrated embodiment, the first and second ports 30 and 32 comprise ring-shaped crimp anchors 58 and 60 that respectively crimp right-hand and left-hand port-defining portions of the first purge bladder 22 onto the conduit's outer surface. The crimp anchors 58 and 60 can be made from any suitable material that can be permanently deformed to provide the desired crimping action. It should be noted that the conduit 53 represents only one possible means for transferring purge gas through the first purge bladder 22. In an alternate embodiment, the conduit 53 could be replaced by the first and second purge gas delivery tubes 50 and 52 themselves. In that case, the first and second purge gas delivery tubes 50 and 52 would not terminate at the first port 30, but would extend through the first purge bladder 22 to its second port 32. The first purge gas delivery tube 50 could then be apertured within the first gas-receiving chamber 28 in order to inflate the first purge bladder 22.

Inflation of the second purge bladder 24 occurs as a result of the purge gas delivered through the bridge conduit 26. If present, the gas discharge valve assembly 44 prevents over-inflation of the purge bladders 22 and 24 by venting purge gas when a predetermined sealing pressure has been achieved that is effective to seal the weld zone. The gas discharge valve assembly 44 vents purge gas into the weld zone, and thus supplements the purge gas delivered by the second purge gas delivery tube 52 through the purge gas discharge port 54.

In the illustrated embodiment, the gas discharge valve assembly 44 comprises a three-way T-coupler 44A. The right leg of the T-coupler 44A may be attached to the female coupler member 42B of the quick-disconnect coupler 42 using a threaded connection. For example, the right leg of the T-coupler 44A may be internally threaded and the female coupler member 42B may be externally threaded, or visa versa. A connector coupler 62 may be used to attach the left leg of the T-coupler 44A to the first port 36 of the second purge bladder 24.

Figure 2B:
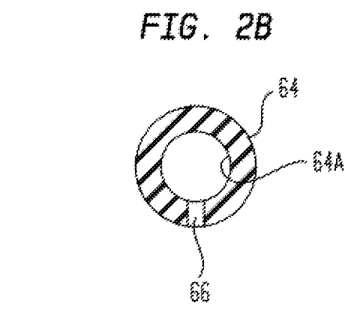
FIG. 2B is a cross-sectional view taken along line 2B-2B of FIG. 2.

The left leg of the T-coupler 44A may be attached to the right side of the connector coupler 62 of the quick-disconnect coupler 42 using a threaded connection. For example, the left leg of the T-coupler 44A may be internally threaded and the right side of the connector coupler 52 may be externally threaded, or visa versa. The left side of the connector coupler 62 may be formed with a barbed tip (not shown) that inserts into the end of a single-path conduit 66 that extends from the first port 36 of the second purge bladder 24 to the second port 38 thereof. The conduit 66 comprises an interior gas-carrying pathway 64A (see FIG. 2B) that terminates at or prior to the second port 38 of the second purge bladder 24 in order to prevent the escape of purge gas therefrom. The gas-carrying pathway 64A is used to inflate the second purge bladder 24. This may be accomplished by forming one or more vent apertures 66 in the conduit 64 that vent pass purge gas from the gas-carrying pathway 64A to the second gas-receiving chamber 34.

Each end of the conduit 64 may be respectively secured to the first and second ports 36 and 38 of the second purge bladder 24 in any suitable manner. In the illustrated embodiment, the first and second ports 36 and 38 comprise ring-shaped crimp anchors 68 and 70 that respectively crimp right-hand and left-hand port-defining portions of the first purge bladder 22 onto the conduit's outer surface. The crimp anchors 68 and 70 can be made from any suitable material that can be permanently deformed to provide the desired crimping action. It should be noted that the conduit 64 represents only one possible means for delivering purge gas into the second purge bladder 24. In an alternate embodiment, the right-hand port-defining side of the purge bladder 24 could simply be crimped to the connector coupler 62. However, one advantage of using the conduit 64 is to maintain the shape of the second purge bladder 24. The conduit 64 does this by supporting the second port 38 in line with the first port 36.

Returning now to the first purge bladder 22 of FIG. 2, an air entry port 72 is additionally provided at the first purge bladder's second port 32. The air entry port 72 may be implemented as a coupler having a barbed tip that inserts into a first end of a third gas-delivery pathway 53C (see FIG. 2A) in the conduit 53. The third gas-carrying pathway 53C of the conduit 53, which connects at its first end to the air entry port 72 at the second port 32 of the first purge bladder 22, is connected at a second end thereof to an air discharge tube 74 at the first port 32. Although not shown, a connector coupler having a barbed tip on each end may be used to provide the desired connection. The free end of the air discharge tube 74 terminates at an air discharge port 76, which may be implemented as suitable connection coupler member. An air pathway is thus provided for venting air from the weld zone. As is known, an air pathway could also be provided at other locations on the first purge bladder 22, and need not extend between the first port 30 and the second port 32.

Figure 4:
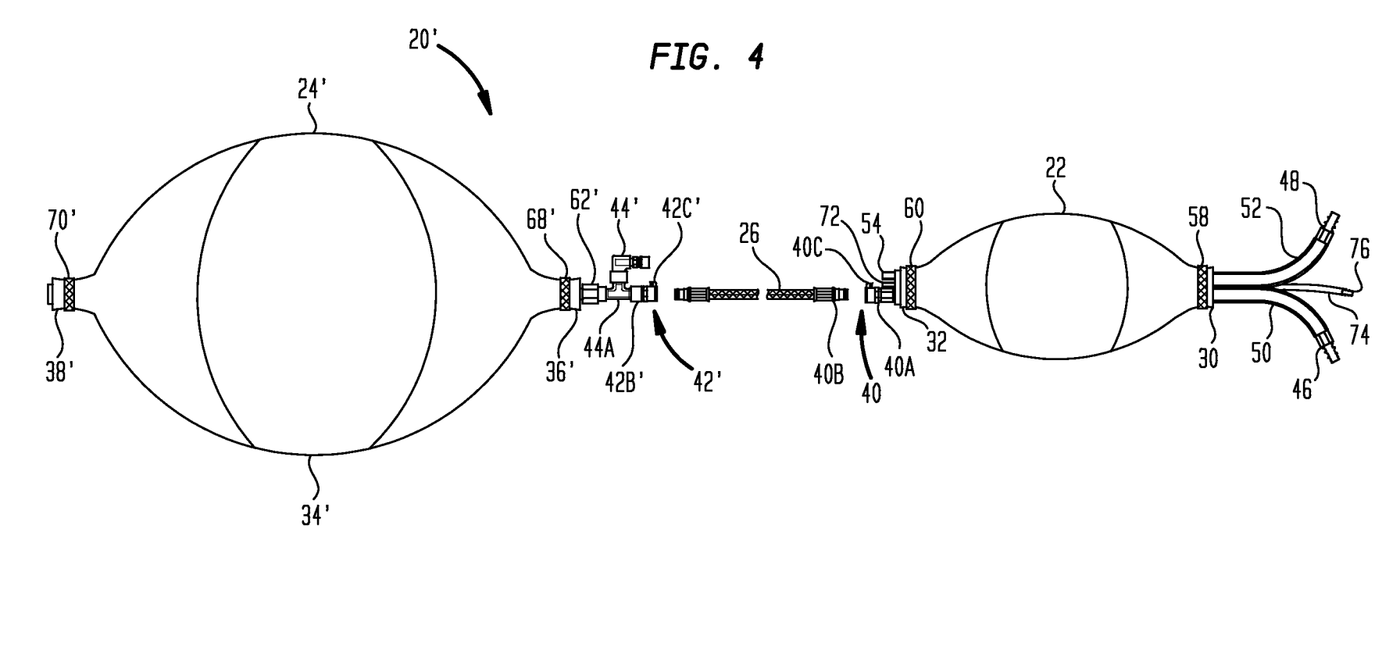
FIG. 4 is a side elevation view showing another example embodiment of an inflatable purge dam apparatus according to the present disclosure.

It will be seen in FIG. 2 that the first and second purge bladders 22 and 24 may be of the same size. This allows the purge dam apparatus 20 to be used in pipe installations where the purge bladders 22 and 24 engage pipe sections having the same diameter. Alternatively, as shown in FIG. 4, the first purge bladder 22 may be used with an alternate purge bladder 24' of different size to form a modified purge dam apparatus 20'. The modified purge dam apparatus 20' may be used in pipe installations where the purge bladders 22 and 24' engage pipe sections having different diameters. Except for its larger size, the purge bladder 24' is the same as the purge bladder 24 of FIG. 2, as shown by the use of corresponding reference numbers. Advantageously, the configuration of FIG. 2 can be easily converted to the configuration of FIG. 3 by disconnecting the purge bladder 24 from the second end of the bridge conduit 26 and replacing it with the purge bladder 24'.

Figure 5:
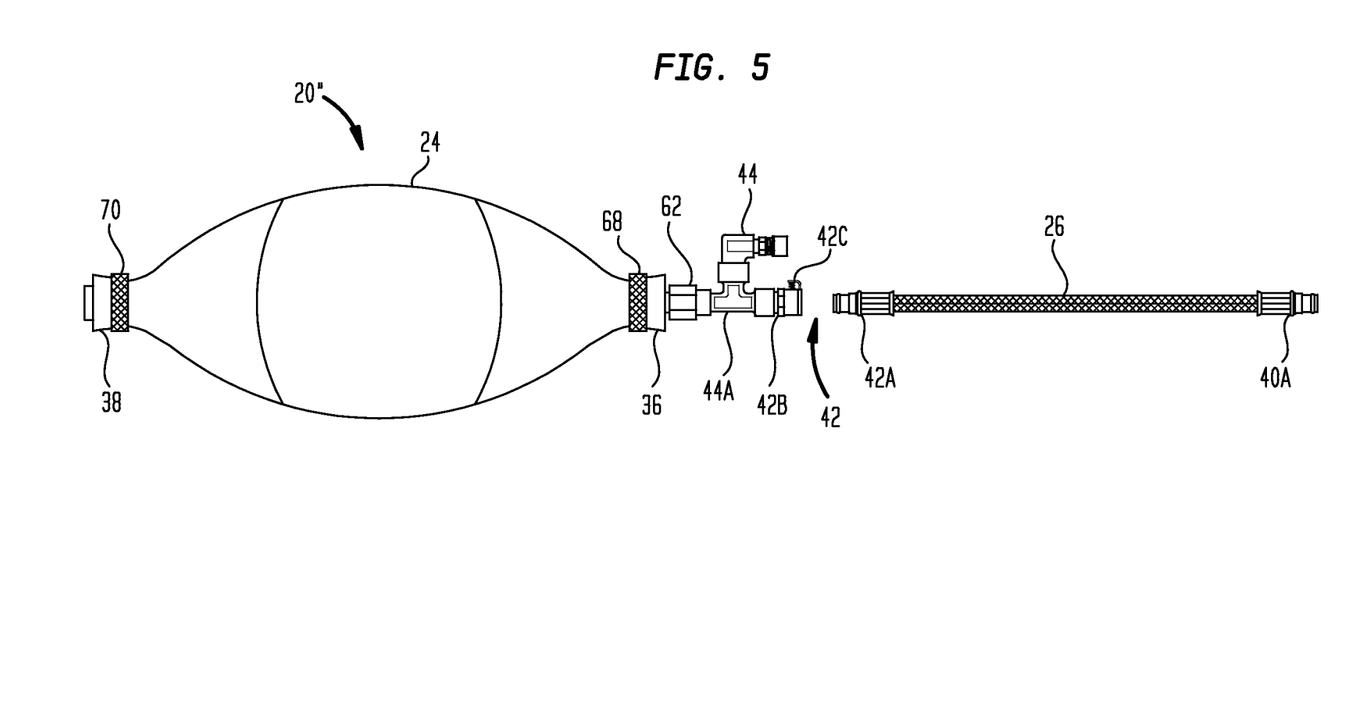
FIG. 5 is a side elevation view showing another example embodiment of an inflatable purge dam apparatus according to the present disclosure.

A further modification is shown in FIG. 5, which illustrates an inflatable purge dam apparatus 20". The purge dam apparatus 20" is similar to the purge dam apparatus 20 of FIG. 2, except that the first purge bladder 22 is not used. Instead, the purge dam apparatus 20" comprises only the second purge bladder 24, and the bridge conduit 26 serves as a purge gas delivery tube that may be connected to receive purge gas from a purge gas supply. The purge dam apparatus 20" is useful for welding applications in which only one side of a weld zone needs to be dammed.

In any of the foregoing embodiments, the bridge conduit 26 may be of a first length, and one or more additional bridge conduits of different length may be provided for connection between the first and second purge bladders 22 and 24 (or 22 and 24'), such that the distance between the purge bladders may be changed for use in different pipe installations. It will also be appreciated that individual components of any of the purge dam apparatus 20, 20' and 20" can be separately manufactured and sold for as sub-assembly apparatus for use in forming any number of field-customizable purge dam devices. As mentioned, one purge dam sub-assembly apparatus could consist of the bridge conduit 26, or another conduit of different length. Another purge dam sub-assembly apparatus could consist of the first purge bladder 22 mounting the female coupler member 40B, possibly together with the first purge gas delivery port and tube 46/50, the second purge gas delivery port and tube 48/52, and the air discharge tube and port 74/76. Another purge dam sub-assembly apparatus could consist of the second purge bladder 24 mounting the gas discharge valve assembly 44, and the latter mounting the female coupler member 42B, such that the female coupler member is indirectly mounted to the second purge bladder. Alternatively, the second purge bladder 24 could directly mount the female coupler member 42B without the gas discharge valve assembly 44.

Accordingly, embodiments of a field-customizable inflatable purge dam apparatus has been disclosed. While various embodiments have been described, it should be apparent that many variations and alternative embodiments could be implemented in accordance with the invention. It is understood, therefore, that the invention is not to be in any way limited except in accordance with the spirit of the appended claims and their equivalents.

What is claimed is:
1. A field-customizable modular inflatable purge dam system for welding that is field-customizable by hand without the use of tools, comprising:
  a set of two or more bridge conduits of different length;
  said bridge conduits each being adapted to selectively interconnect a pair of inflatable purge bladders in order to change a spacing distance between said purge bladders without having to substitute a different purge dam assembly;
  said bridge conduits each comprising:
    a first end and a second end;
    a quick-disconnect coupler member attached to each of said first end and said second end, said quick-disconnect coupler members each being adapted to connect to a counterpart quick-disconnect coupler member on one of said inflatable purge bladders;
  a set of three or more inflatable purge bladders adapted to be selectively interconnected by any one of said bridge conduits, at least two of said inflatable purge bladders being of different size;

each said inflatable purge bladder comprising:
an interior gas-receiving chamber and defining a first port on one side thereof and a second port on another side thereof;
one of said counterpart quick-disconnect coupler members attached to said inflatable purge bladder at one of said first port or said second port, said counterpart quick-disconnect coupler member being configured to connect to one of said quick-disconnect coupler members on said bridge conduits;
said quick-disconnect coupler(s) and said counterpart quick-disconnect coupler(s) being hand-operable without using tool-engaging flanges, set screws or other tool-engaging means; and
whereby said quick-disconnect couplers allow said bridge conduits to be selectively attached to, and detached from, said inflatable purge bladders without the use of tools, such that said modular inflatable purge dam system can be field-customized by hand without the use of tools by combining any two of said inflatable purge bladders with any one of said bridge conduits.

2. The modular inflatable purge dam system of claim 1, wherein said quick-disconnect couplers and said counterpart quick-disconnect couplers comprise male coupler members or female coupler members.

3. The modular inflatable purge dam system of claim 2, wherein said quick-disconnect couplers comprise male coupler members that are mounted to each end of said bridge conduits.

4. The modular inflatable purge dam system of claim 3, wherein said counterpart quick-disconnect couplers comprise female coupler members that are mounted to said first or second port of said purge bladders.

5. The modular inflatable purge dam system of claim 4, wherein said first or second port of at least one of said purge bladders mounts a pressure-sensitive gas discharge valve assembly that in turn mounts one of said female coupler members that engages one of said male coupler members on said bridge conduits.

6. The modular inflatable purge dam system of claim 1, wherein said quick-disconnect couplers comprise hand-operable clasps.

7. The modular inflatable purge dam system of claim 1, wherein said quick-disconnect couplers comprise spring-loaded disconnect push buttons.

8. The modular inflatable purge dam system of claim 1, wherein said at least two purge bladders of different size are suitable for use in pipe installations where said purge bladders engage pipe sections having different nominal pipe size diameters.

9. A field-customizable modular inflatable purge dam system for welding that is field-customizable by hand without the use of tools, comprising:
a first bridge conduit;
a second bridge conduit;
said bridge conduits being of different length;
said bridge conduits each being adapted to selectively interconnect a pair of inflatable purge bladders in order to change a spacing distance between said purge bladders without having to substitute a different purge dam assembly;
said bridge conduits each comprising:
a first end and a second end;
a quick-disconnect coupler member attached to each of said first end and said second end, said quick-disconnect coupler members each being adapted to connect to a counterpart quick-disconnect coupler member on one of said inflatable purge bladders;
a first inflatable purge bladder;
a second inflatable purge bladder;
a third inflatable purge bladder;
said inflatable purge bladders being selectively interconnectable to any one of said bridge conduits;
at least two of said inflatable purge bladders being of different size;
each said inflatable purge bladder comprising:
an interior gas-receiving chamber and defining a first port on one side thereof and a second port on another side thereof;
one of said counterpart quick-disconnect coupler members attached to said inflatable purge bladder at one of said first port or said second port, said counterpart quick-disconnect coupler member being configured to connect to one of said quick-disconnect coupler members on said bridge conduits;
said quick-disconnect coupler(s) and said counterpart quick-disconnect coupler(s) being hand-operable without using tool-engaging flanges, set screws or other tool-engaging means; and
whereby said quick-disconnect couplers allow said bridge conduits to be selectively attached to, and detached from, said inflatable purge bladders without the use of tools, such that said modular inflatable purge dam system can be field-customized by hand without the use of tools by combining any two of said inflatable purge bladders with any one of said bridge conduits.

10. The modular inflatable purge dam system of claim 9, wherein said quick-disconnect couplers and said counterpart quick-disconnect couplers comprise male coupler members or female coupler members.

11. The modular inflatable purge dam system of claim 10, wherein said quick-disconnect couplers comprise male coupler members that are mounted to each end of said bridge conduits.

12. The modular inflatable purge dam system of claim 11, wherein said counterpart quick-disconnect couplers comprise female coupler members that are mounted to said first or second port of said purge bladders.

13. The modular inflatable purge dam system of claim 12, wherein said first or second port of at least one of said purge bladders mounts a pressure-sensitive gas discharge valve assembly that in turn mounts one of said female coupler members that engages one of said male coupler members on said bridge conduits.

14. The modular inflatable purge dam system of claim 9, wherein said quick-disconnect couplers comprise hand-operable clasps.

15. The modular inflatable purge dam system of claim 9, wherein said quick-disconnect couplers comprise spring-loaded disconnect push buttons.

16. The modular inflatable purge dam system of claim 9, wherein said at least two purge bladders of different size are suitable for use in pipe installations where said purge bladders engage pipe sections having different nominal pipe size diameters.

17. A field-customizable modular inflatable purge dam system for welding that is field-customizable by hand without the use of tools, comprising:
a set of two or more bridge conduits of different length;
said bridge conduits each being adapted to selectively interconnect a pair of inflatable purge bladders in order to change a spacing distance between said purge bladders without having to substitute a different purge dam assembly;

said bridge conduits each comprising:
  a first end and a second end;
  a male quick-disconnect coupler member attached to each of said first end and said second end, said quick-disconnect coupler members each being adapted to connect to a female counterpart quick-disconnect coupler member on one of said inflatable purge bladders;

a set of three or more inflatable purge bladders adapted to be selectively interconnected by any one of said bridge conduits, at least two of said inflatable purge bladders being of different size so as to be suitable for use in pipe installations where said purge bladders engage pipe sections having different nominal pipe size diameters;

each said inflatable purge bladder comprising:
  an interior gas-receiving chamber and defining a first port on one side thereof and a second port on another side thereof;
  one of said counterpart quick-disconnect coupler members attached to said inflatable purge bladder at one of said first port or said second port, said counterpart quick-disconnect coupler member being configured to connect to one of said quick-disconnect coupler members on said bridge conduits;

said quick-disconnect coupler(s) and said counterpart quick-disconnect coupler(s) being hand-operable without using tool-engaging flanges, set screws or other tool-engaging means;

said quick-disconnect couplers comprising hand-operable clasps with spring-loaded disconnect push buttons; and whereby said quick-disconnect couplers allow said bridge conduits to be selectively attached to, and detached from, said inflatable purge bladders without the use of tools, such that said modular inflatable purge dam system can be field-customized by hand without the use of tools by combining any two of said inflatable purge bladders with any one of said bridge conduits.

* * * * *